US012510890B2

(12) United States Patent
Fairfield et al.

(10) Patent No.: US 12,510,890 B2
(45) Date of Patent: Dec. 30, 2025

(54) REMOTE ASSISTANCE FOR AUTONOMOUS VEHICLES IN PREDETERMINED SITUATIONS

(71) Applicant: Waymo LLC, Mountain View, CA (US)

(72) Inventors: Nathaniel Fairfield, Mountain View, CA (US); Joshua Seth Herbach, Mountain View, CA (US); Vadim Furman, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 363 days.

(21) Appl. No.: 18/296,707

(22) Filed: Apr. 6, 2023

(65) Prior Publication Data

US 2023/0244228 A1 Aug. 3, 2023

Related U.S. Application Data

(63) Continuation of application No. 17/329,020, filed on May 24, 2021, now Pat. No. 11,650,584, which is a
(Continued)

(51) Int. Cl.
*G05D 1/00* (2024.01)
*B60W 30/00* (2006.01)
*B60W 60/00* (2020.01)

(52) U.S. Cl.
CPC .......... *G05D 1/0044* (2013.01); *B60W 30/00* (2013.01); *B60W 60/001* (2020.02);
(Continued)

(58) Field of Classification Search
None
See application file for complete search history.

(56) References Cited

U.S. PATENT DOCUMENTS 4,887,223 A * 12/1989 Christian ............... G05D 1/028
701/28
5,448,479 A 9/1995 Kemner
(Continued)

FOREIGN PATENT DOCUMENTS

CN 1481631 A 3/2004
CN 201508493 U 6/2010
(Continued)

OTHER PUBLICATIONS

International Searching Authority, International Search Report and Written Opinion for PCT/US2015/015039 mailed May 19, 2015, 10 pages*.
(Continued)

*Primary Examiner* — Lail A Kleinman
(74) *Attorney, Agent, or Firm* — McDonnell Boehnen Hulbert & Berghoff LLP

(57) ABSTRACT

Example systems and methods enable an autonomous vehicle to request assistance from a remote operator in certain predetermined situations. One example method includes determining a representation of an environment of an autonomous vehicle based on sensor data of the environment. Based on the representation, the method may also include identifying a situation from a predetermined set of situations for which the autonomous vehicle will request remote assistance. The method may further include sending a request for assistance to a remote assistor, the request including the representation of the environment and the identified situation. The method may additionally include receiving a response from the remote assistor indicating an autonomous operation. The method may also include causing the autonomous vehicle to perform the autonomous operation.

20 Claims, 11 Drawing Sheets

Related U.S. Application Data continuation of application No. 16/270,271, filed on Feb. 7, 2019, now Pat. No. 11,016,482, which is a continuation of application No. 15/618,768, filed on Jun. 9, 2017, now Pat. No. 10,241,508, which is a continuation of application No. 14/195,682, filed on Mar. 3, 2014, now Pat. No. 9,720,410.

(52) U.S. Cl.
CPC ......... *G05D 1/0011* (2013.01); *G05D 1/0027* (2013.01); *G05D 1/0033* (2013.01); *G05D 1/0038* (2013.01)

(56) References Cited

U.S. PATENT DOCUMENTS

| | | | |
|---|---|---|---|
| 6,516,262 B2* | 2/2003 | Takenaga | G08G 1/096791 701/28 |
| 6,876,907 B2 | 4/2005 | Alcatel | |
| 7,240,879 B1 | 7/2007 | Cepollina | |
| 8,063,793 B2 | 11/2011 | Shrum | |
| 8,126,642 B2 | 2/2012 | Trepagnier | |
| 8,131,432 B2 | 3/2012 | Senneff | |
| 8,340,902 B1 | 12/2012 | Chiang | |
| 8,437,890 B2 | 5/2013 | Anderson et al. | |
| 8,467,928 B2 | 6/2013 | Anderson | |
| 8,473,140 B2 | 6/2013 | Norris et al. | |
| 8,521,352 B1 | 8/2013 | Ferguson | |
| 8,527,199 B1 | 9/2013 | Burnette et al. | |
| 8,532,862 B2 | 9/2013 | Neff | |
| 8,577,517 B2 | 11/2013 | Phillips | |
| 8,639,408 B2 | 1/2014 | Anderson | |
| 8,996,224 B1* | 3/2015 | Herbach | B60W 60/0011 701/25 |
| 9,720,410 B2* | 8/2017 | Fairfield | G05D 1/0033 |
| 11,762,390 B1* | 9/2023 | Alagic | G06F 18/211 701/23 |
| 2006/0089800 A1 | 4/2006 | Svendsen | |
| 2007/0021915 A1 | 1/2007 | Breed | |
| 2007/0233338 A1 | 10/2007 | Ariyur | |
| 2008/0027591 A1 | 1/2008 | Lenser | |
| 2008/0262721 A1 | 10/2008 | Guo | |
| 2009/0079836 A1 | 3/2009 | Fischer | |
| 2010/0017215 A1 | 1/2010 | Nigam | |
| 2010/0061591 A1 | 3/2010 | Okada et al. | |
| 2010/0063663 A1* | 3/2010 | Tolstedt | G05D 1/0231 701/41 |
| 2010/0100268 A1 | 4/2010 | Zhang | |
| 2010/0104199 A1 | 4/2010 | Zhang | |
| 2010/0106356 A1* | 4/2010 | Trepagnier | G05D 1/0214 701/25 |
| 2011/0144828 A1 | 6/2011 | Chengalva | |
| 2011/0251768 A1 | 10/2011 | Luo | |
| 2011/0288695 A1 | 11/2011 | Gariepy | |
| 2012/0083959 A1 | 4/2012 | Dolgov | |
| 2012/0083964 A1 | 4/2012 | Montemerlo | |
| 2012/0095619 A1 | 4/2012 | Pack | |
| 2012/0310465 A1 | 12/2012 | Boatright et al. | |
| 2013/0002481 A1 | 1/2013 | Solomon | |
| 2013/0061044 A1 | 3/2013 | Pinkus | |
| 2013/0253765 A1 | 9/2013 | Bolourchi | |
| 2015/0032366 A1 | 1/2015 | Man | |
| 2015/0100567 A1 | 4/2015 | Weir | |
| 2015/0294431 A1 | 10/2015 | Fiorucci | |
| 2016/0301698 A1 | 10/2016 | Katara | |
| 2017/0212518 A1* | 7/2017 | Iimura | G05D 1/0214 |
| 2018/0082134 A1* | 3/2018 | Sivaraman | G06V 40/28 |
| 2024/0034348 A1* | 2/2024 | Robinson | B60W 60/001 |
| 2024/0262392 A1* | 8/2024 | Kan | B60W 60/0027 |

FOREIGN PATENT DOCUMENTS

| | | |
|---|---|---|
| CN | 202448860 U | 9/2012 |
| CN | 103339009 A | 5/2016 |
| CN | 103339010 A | 8/2016 |
| EP | 2400473 | 12/2011 |
| FR | 2940211 A3 | 6/2010 |
| JP | 09-244745 | 9/1997 |
| JP | H1145322 A | 2/1999 |
| JP | 2000-321081 | 11/2000 |
| JP | 2011128889 A | 6/2011 |
| WO | 2009140514 | 5/2008 |
| WO | 2011104369 | 2/2010 |
| WO | 2011/154680 | 12/2011 |
| WO | 2012044743 A2 | 4/2012 |
| WO | 2013147994 A1 | 10/2013 |
| WO | 2013180787 A1 | 12/2013 |

OTHER PUBLICATIONS

International Searching Authority, International Search Report and Written Opinion for PCT/US2015/015040 mailed May 15, 2015, 14 pages*.

Arkin et al., "Overriding Ethical Constraints in Lethal Autonomous Systems", pp. 1-9, Jan. 2012, Mobile Robot Laboratory, Georgia Institute of Technology, Atlanta, GA, USA*.

Funke et al., "Up to the limits: Autonomous Audi TTS", Intelligent Vehicles Symposium (IV) (2012)*.

Mathibela et al. "A Roadwork Scene Signature Based on the Opponent Colour Model", IEEE/RSJ International Conference on Intelligent Robots and Systems (IROS) (2013).

* cited by examiner

REMOTE ASSISTANCE FOR AUTONOMOUS VEHICLES IN PREDETERMINED SITUATIONS

CROSS-REFERENCE TO RELATED APPLICATION

The present disclosure is a continuation of U.S. patent application Ser. No. 17/329,020, filed on May 24, 2021, which is a continuation of U.S. patent application Ser. No. 16/270,271 (now U.S. Pat. No. 11,016,482), filed on Feb. 7, 2019, which is a continuation of U.S. patent application Ser. No. 15/618,768 (now U.S. Pat. No. 10,241,508), filed on Jun. 9, 2017, which is a continuation of U.S. patent application Ser. No. 14/195,682 (now U.S. Pat. No. 9,720,410), filed on Mar. 3, 2014, and entitled "Remote Assistance for Autonomous Vehicles in Predetermined Situations," the entire contents of each of which are herein incorporated by reference as if fully set forth in this description.

BACKGROUND

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present disclosure provides methods and apparatuses that enable an autonomous vehicle to request assistance from a remote operator in certain predetermined situations. During the operation of an autonomous vehicle, the vehicle may identify a situation from a set of predetermined situations for which it will request assistance. The vehicle may then send a request for assistance to a remote assistor, identifying the situation as well as a sensor representation of its environment. The vehicle may then receive a response back from the remote assistor indicating how to proceed.

In one example, a method is provided that includes determining a representation of an environment of an autonomous vehicle based on sensor data of the environment. Based on the representation, the method may also include identifying a situation from a predetermined set of situations for which the autonomous vehicle will request remote assistance. The method may further include sending a request for assistance to a remote assistor, the request including the representation of the environment and the identified situation. The method may additionally include receiving a response from the remote assistor indicating an autonomous operation. The method may also include causing the autonomous vehicle to perform the autonomous operation.

In another example, an additional method is provided that includes receiving a request for assistance from an autonomous vehicle, the request including a representation of an environment of the autonomous vehicle and an identified situation from a predetermined set of situations. The method may additionally include receiving sensor data representative of the environment of the autonomous vehicle. Based on the representation of the environment and the sensor data, the method may also include determining an autonomous operation for the autonomous vehicle to perform in the identified situation. The method may additionally include sending a response to the request for assistance to the autonomous vehicle to perform the autonomous operation in the identified situation.

In a further example, an autonomous vehicle including a control system is disclosed. The control system may be configured to determine a representation of an environment of the autonomous vehicle based on sensor data of the environment. Based on the representation, the control system may also be configured to identify a situation from a predetermined set of situations for which the autonomous vehicle will request remote assistance. The control system may further be configured to send a request for assistance to a remote assistor, the request including the representation of the environment and the identified situation. The control system may additionally be configured to receive a response from the remote assistor indicating an autonomous operation. The control system may be further configured to cause the autonomous vehicle to perform the autonomous operation.

In yet another example, a system may include means for determining a representation of an environment of an autonomous vehicle based on sensor data of the environment. Based on the representation, the system may also include means for identifying a situation from a predetermined set of situations for which the autonomous vehicle will request remote assistance. The system may further include means for sending a request for assistance to a remote assistor, the request including the representation of the environment and the identified situation. The system may additionally include means for receiving a response from the remote assistor indicating an autonomous operation. The system may also include means for causing the autonomous vehicle to perform the autonomous operation.

In an additional example, a system may include means for receiving a request for assistance from an autonomous vehicle, the request including a representation of an environment of the autonomous vehicle and an identified situation from a predetermined set of situations. The system may also include means for receiving sensor data representative of the environment of the autonomous vehicle. Based on the representation of the environment and the sensor data, the system may also include means for determining an autonomous operation for the autonomous vehicle to perform in the identified situation. The system may further include means for sending a response to the request for assistance to the autonomous vehicle to perform the autonomous operation in the identified situation.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
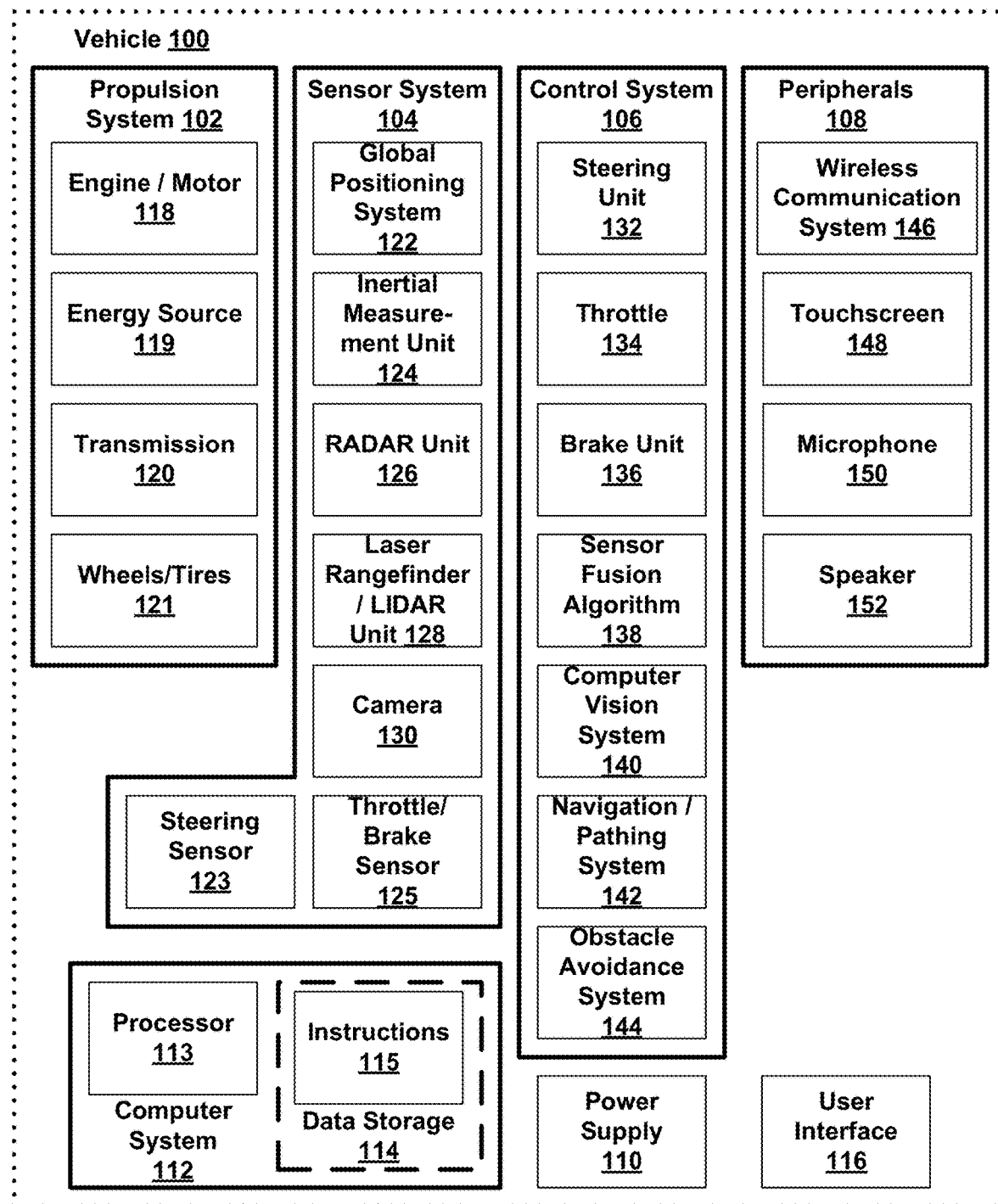
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

The present disclosure provides methods and apparatuses that enable an autonomous vehicle to request assistance from a remote operator (e.g., a human guide or a remote computing system) when the vehicle encounters situations where such assistance may be useful or necessary. For example, an unprotected left turn may describe a scenario where an autonomous vehicle that is going to make a left turn has a solid green light but no green arrow, and there is a possibility of oncoming traffic that may interfere with the turn. In such a scenario, the vehicle may have a certain representation of its environment indicating that it can safely complete a left turn (e.g., that there is no oncoming traffic or other obstacles that might interfere with the turn). However, it may be useful in such a scenario to have a remote operator verify (e.g., based on a live video feed taken from within the car) that no traffic is coming from the other direction that might interfere with the turn.

A predetermined set of situations may be defined for which an autonomous vehicle will ask for assistance from a remote operator. For instance, the set may include situations for which the vehicle can (1) detect that it is in the situation, (2) ask a useful question to a remote assistor, and (3) automatically interpret an answer to the question from the remote assistor in order to proceed with operation. The set of situations where remote assistance is requested may be limited in order to minimize delays in operation of the vehicle and/or due to limits in bandwidth or available remote assistors. In addition to unprotected left turns, other example situations that may be included in the set include right turns on red, checking vehicle occupancy after pickup or dropoff, navigating lane blockages, or interpreting a temporary stop sign.

Some predetermined situations may involve vehicle behaviors (e.g., unprotected left turns) that are known in advance such that an estimate may be made about when the situation may be encountered. In those instances, advanced notification may be supplied to a remote assistor about when assistance may be needed (e.g., to make sure a remote assistor is available to provide assistance when needed). In other scenarios, it may not be possible to provide advanced notification (e.g., when a temporary stop sign is detected). In some example systems, a certain number of remote assistors may always be available to handle these types of requests.

The vehicle may send sensor data of its environment (e.g., a live video feed) to the remote operator along with a request for assistance. The remote operator may then confirm that the vehicle's plan is correct based on the sensor data (e.g., verify that there is no oncoming traffic for an unprotected left turn). In some examples, the vehicle may hold position until it receives a "release" from the remote operator to proceed with the proposed operation. In other examples, the remote operator may be presented with a list of two or more possible vehicle operations to select from for a particular scenario (e.g., pass a stopped car on the left or on the right). In additional examples, the remote operator may also be able to suggest other courses of action for the vehicle as well or instead.

In some examples, the remote assistor may be a human operator presented with a user interface that may include information and data from the vehicle (e.g., a proposed course of action for a certain situation in addition to a live video feed taken from the vehicle). The interface may also indicate latency (e.g., how old the data on screen is). In other examples, the remote assistor could instead be a more powerful remote computing system, which may be capable of determining correct vehicle behavior in situations that cannot be easily processed by an autonomous vehicle's on-board computing systems. In further examples, the remote assistor may be a passenger in the vehicle, which may be useful for certain intuitive behaviors that are difficult to automate (e.g., asking a taxi to move forward a few feet before dropping off passengers). Requests for assistance may be sent to multiple remote guides simultaneously and/or to other types of remote guides in some examples as well.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

In some embodiments, the computer system 112 may make a determination about various objects based on data that is provided by systems other than the radio system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
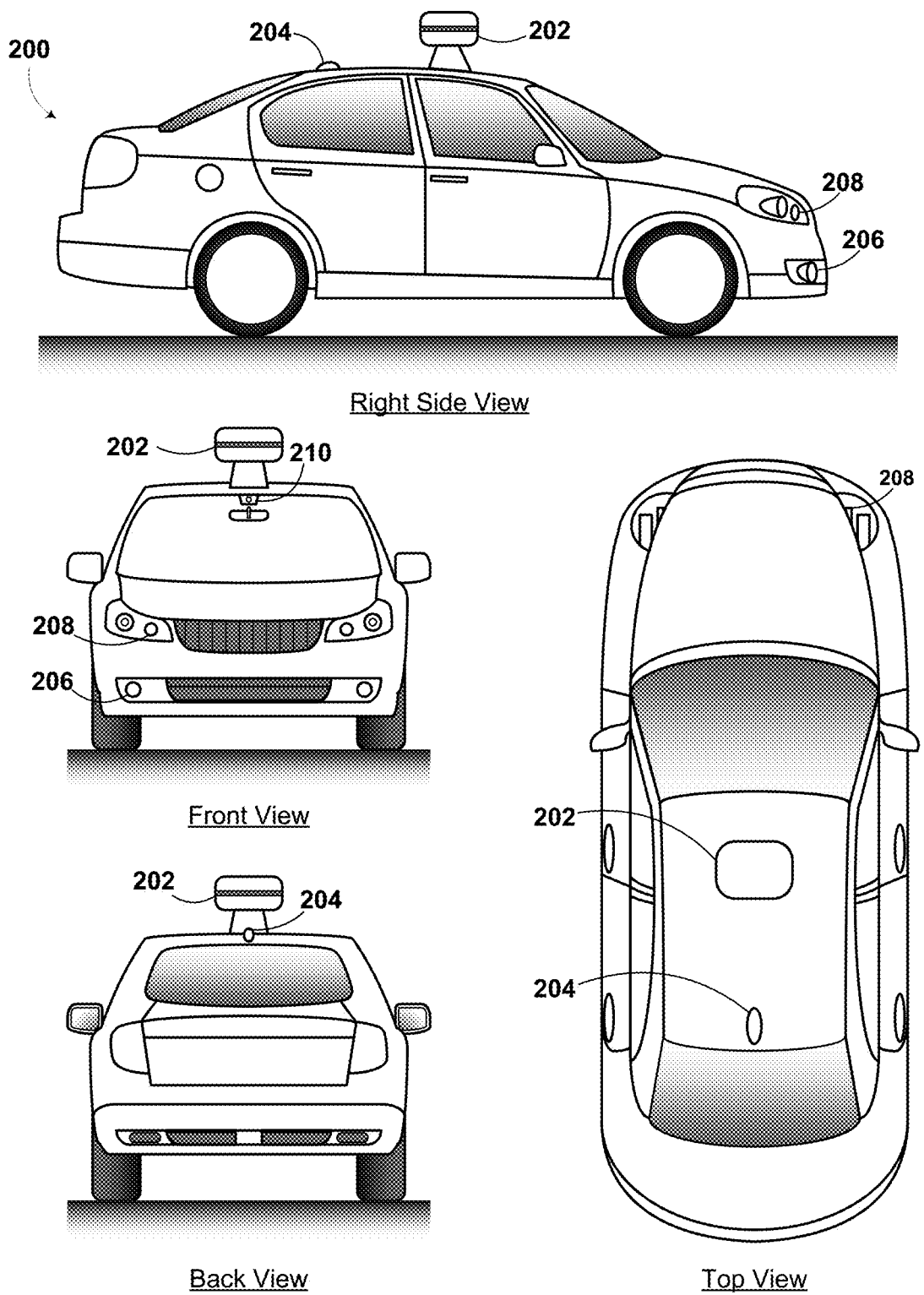
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radio unit 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, radio devices (e.g., Bluetooth and/or 802.11), and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radio unit 206 and laser range finder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

A method 300 is provided for enabling an autonomous vehicle to request assistance from a remote operator in certain predetermined situations. In some examples, method 300 may be carried out by a vehicle such as vehicle 100 and/or vehicle 200 as illustrated and described in reference to FIGS. 1 and 2, respectively. For example, the processes described herein may be carried out using a RADAR unit 126, a laser rangefinder and/or LIDAR unit 128, and/or a camera 130 mounted to an autonomous vehicle in communication with a control system 106, a sensor fusion algorithm 138, a computer vision system 140, a navigation system 142, and/or an obstacle avoidance system 144. Additionally, method 300 may be carried out using sensor data from one or more sensors on an autonomous vehicle (e.g., vehicle 200) such as sensor unit 202 and/or camera 210 as shown in FIG. 2.

Furthermore, it is noted that the functionality described in connection with the flowcharts described herein can be implemented as special-function and/or configured general-function hardware modules, portions of program code executed by a processor (e.g., the processor 113 within computer system 112) for achieving specific logical functions, determinations, and/or steps described in connection with the flowcharts shown in FIG. 3 or FIG. 5. Where used, program code can be stored on any type of computer-readable medium (e.g., computer-readable storage medium or non-transitory media, such as data storage 114 described above with respect to computer system 112 and/or a computer program product 600 described below), for example, such as a storage device including a disk or hard drive.

Figure 3:
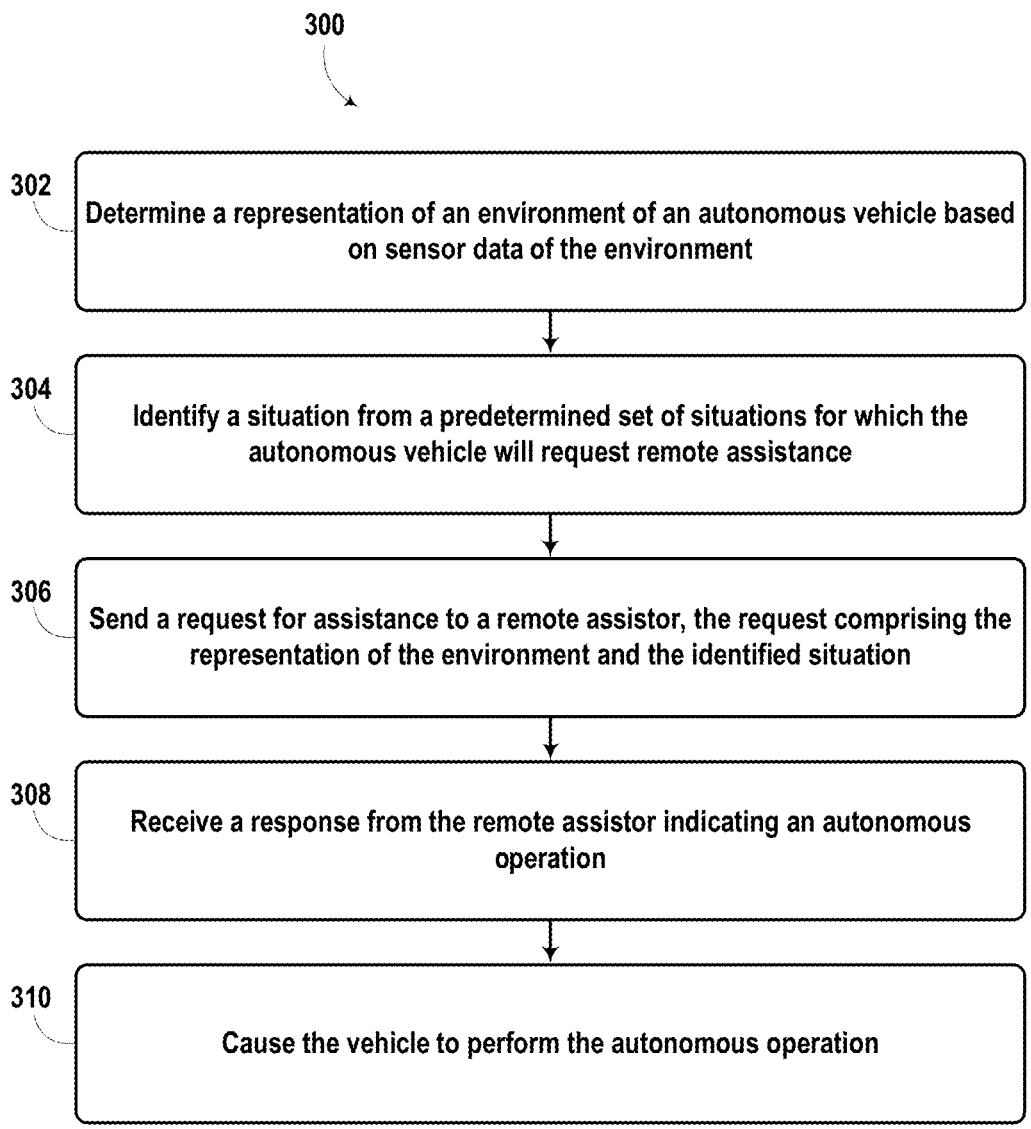
FIG. 3 is a block diagram of a method, according to an example embodiment.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

Figure 4A:
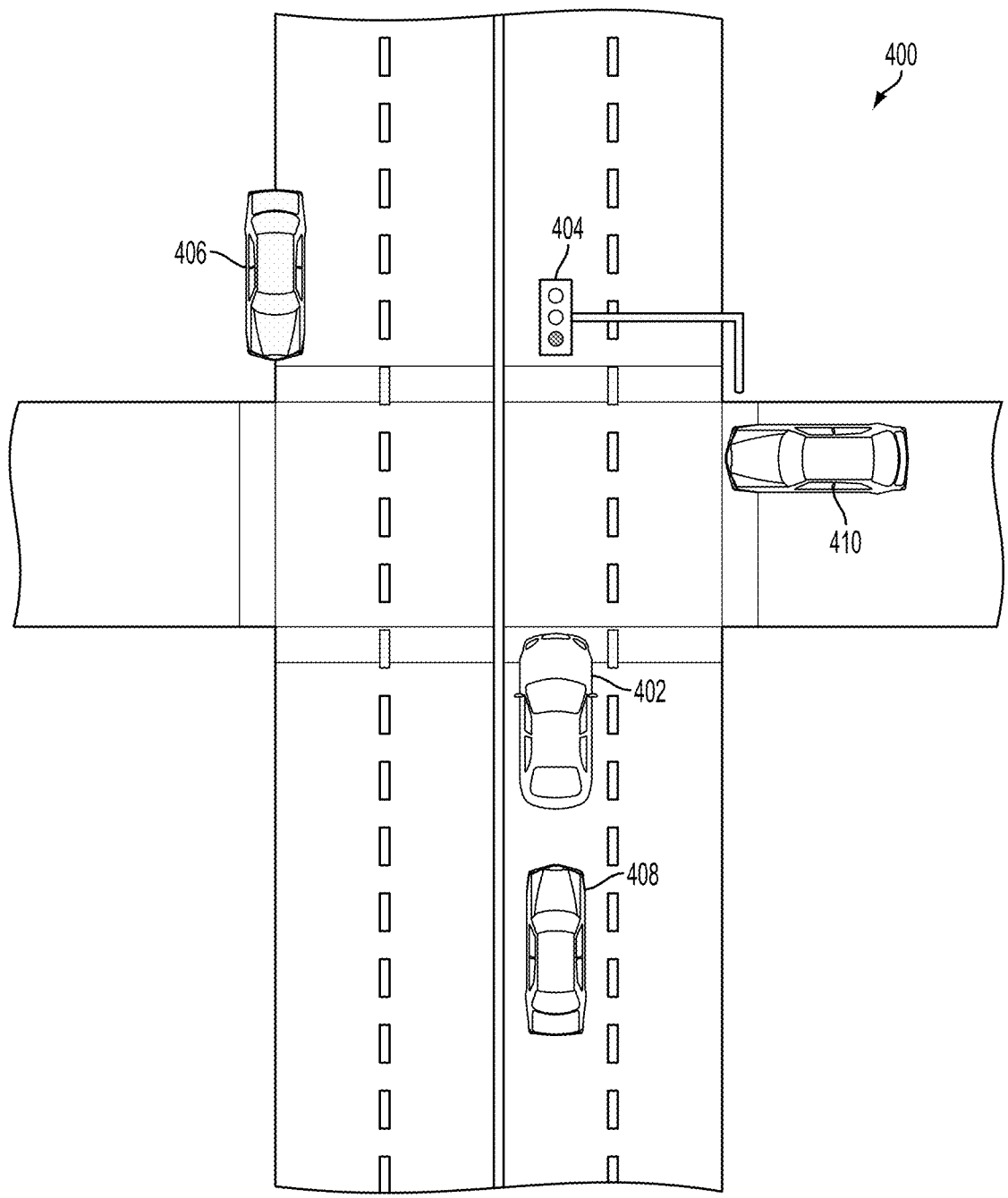
FIG. 4A illustrates a top view of an autonomous vehicle operating scenario, according to an example embodiment.

As shown by block 302 of FIG. 3, method 300 may initially involve determining a representation of an environment of an autonomous vehicle based on sensor data of the environment. FIG. 4A illustrates a top view of a scenario encountered by an autonomous vehicle, in accordance with an example embodiment. As shown, an autonomous vehicle 402 may be operating within an environment 400 containing other vehicles 406, 408, and 410. The autonomous vehicle 402 may be operating within a lane of travel approaching a traffic light 404. In this example, the autonomous vehicle 402 may be planning to make a left turn across the intersection.

Figure 4B:
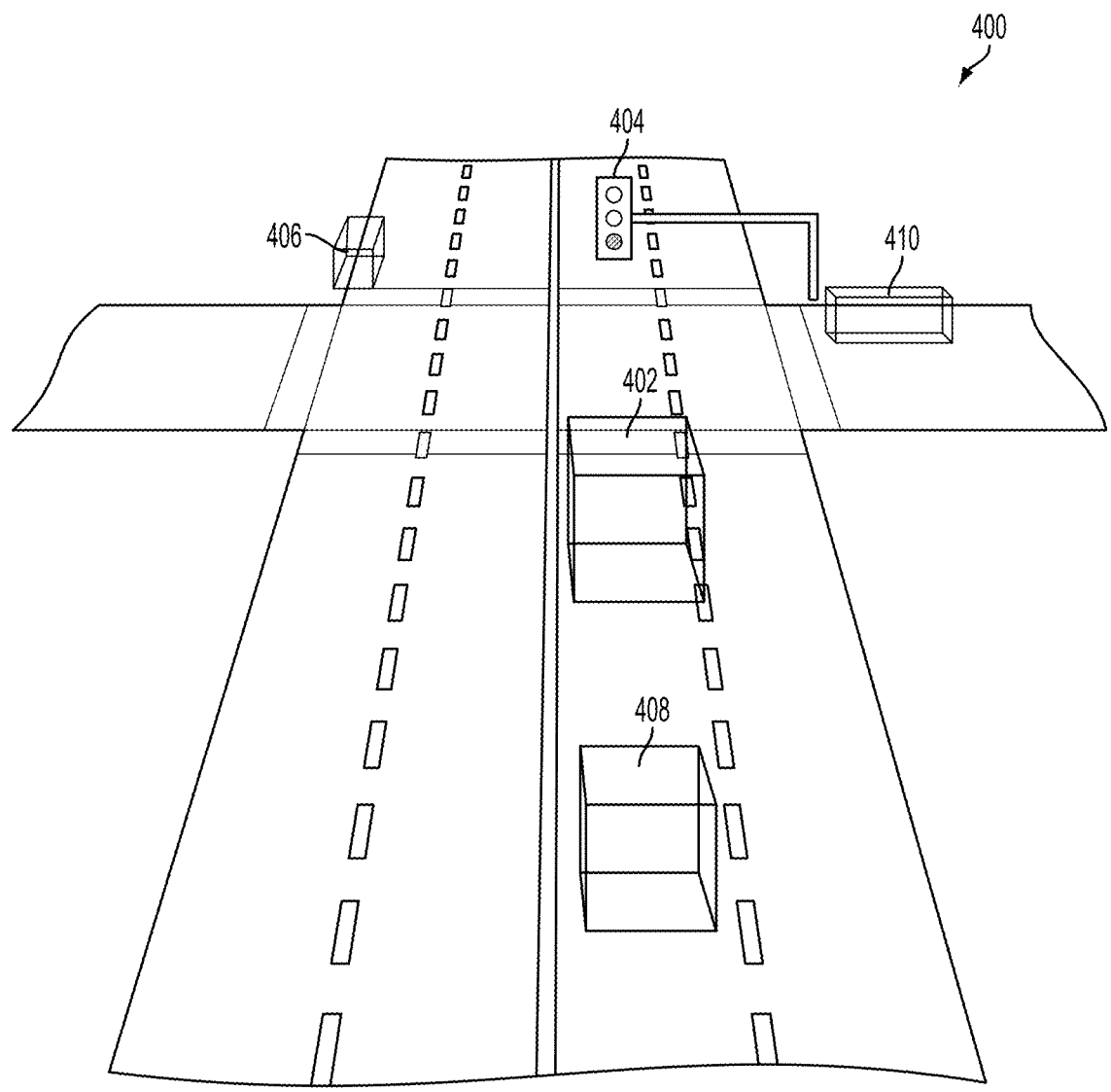
FIG. 4B illustrates a sensor representation of the scenario from FIG. 4A, according to an example embodiment.

FIG. 4B illustrates a representation of the environment from FIG. 4A based on sensor data collected by the vehicle, according to an example embodiment. An autonomous vehicle may receive data collected from environment in which the vehicle operates in a variety of ways. In particular the vehicle may be equipped with one or more sensor systems that provide data describing the surrounding environment. For example, a vehicle may have various sensors, including a camera, a radar unit, a laser range finder, a microphone, a radio unit, and other sensors. Each of these sensors may communicate data to a processor in the vehicle about information each respective sensor receives.

In one example, a camera may be configured to capture still images and/or video. In various embodiments, the vehicle may have more than one camera positioned in different orientations. Also, in some embodiments the camera may be able to move to capture images and/or video in different directions. The camera may be configured to store captured images and video to a memory for later processing by a processing system of the vehicle. The captured images and/or video may form a portion of the sensor data collected from the environment.

In another example, a radar unit may be configured to transmit an electromagnetic signal that will be reflected by various objects near the vehicle. The radar unit may be able to capture reflected electromagnetic signals. The captured reflected electromagnetic signals may enable the radar system (or processing system) to make various determinations about objects that reflected the electromagnetic signal. For example, the distance and position to various reflecting objects may be determined. In various embodiments, the vehicle may have more than one radar unit in different orientations. The radar system may be configured to store captured information to a memory for later processing by a processing system of the vehicle. The information captured by the radar system may form a portion of the sensor data collected from an environment.

In further examples, a laser range-finding system may be configured to transmit an electromagnetic signal (e.g., light, such as that from a gas or diode laser, or other possible light source) that will be reflected by target objects near the vehicle. The laser range-finding system may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as data collected from an environment.

Additionally, in other examples, a microphone may be configured to capture audio data from the environment surrounding the vehicle. Sounds captured by the microphone may include sounds from vehicles or other aspects of the environment. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the sensor data collected from the environment.

In additional examples, the radio unit may be configured to transmit an electromagnetic signal that may take the form of a Bluetooth signal, 802.11 signal, and/or other radio technology signal. The electromagnetic radiation signal may be transmitted via one or more antennas located in a radio unit. Further, the electromagnetic radiation signal may be transmitted with one of many different radio-signaling modes. In some embodiments, it may be desirable to transmit the electromagnetic radiation signal with a signaling mode that requests a response from devices located near the autonomous vehicle. The processing system may be able to detect nearby devices based on the responses communicated back to the radio unit and use this communicated information as a portion of the sensor data collected from the environment.

In some embodiments, the processing system may be able to combine information from some or all of the vehicle's sensors in order to make further determinations about the environment of the vehicle. For example, the processing system may combine both radar information and a captured image to determine if another vehicle or pedestrian is in front of the autonomous vehicle. In other embodiments, other combinations of sensor data may be used by the processing system to make determinations about the environment as well.

As shown in FIG. 4B, the autonomous vehicle 402 may create a representation of its environment 400 based on any combination of possible types of sensor data as described above. In some examples, the representation may not be a perfect copy of the environment. For instance, some of the sensors may be blocked in certain directions or some of the sensor data may be distorted. Additionally, some objects may be abstracted into geometric shapes, such as the representations of the vehicles 406, 408, and 410 shown in the figure. The autonomous vehicle 402 may identify objects or other aspects of the environment with varying levels of precision.

The vehicle 402 may be operating in an autonomous mode in which the vehicle may use a computer system to control the operation of the vehicle with little-to-no human input. For example, a human operator may enter an address into an autonomous vehicle and the vehicle may then be able to drive, without further input from the human (e.g., the human does not have to steer or touch the brake/gas pedals), to the specified destination.

While the vehicle is operating autonomously, the sensor system may be receiving data representative of the environment of the vehicle, as discussed with respect to block 302. The processing system of the vehicle may alter the control of the vehicle based on data received from the various sensors. In some examples, the autonomous vehicle may alter a velocity of the autonomous vehicle in response to data from the various sensors. For instance, the autonomous vehicle may change velocity in order to avoid obstacles, obey traffic laws, etc. When a processing system in the vehicle identifies obstacles or other situations encountered by the autonomous vehicle, the vehicle may be able to autonomously determine how to proceed (e.g., by altering velocity, changing trajectory to avoid an obstacle, and so on).

Block 304 includes identifying a situation from a predetermined set of situations for which the autonomous vehicle will request remote assistance. An autonomous vehicle may periodically encounter a situation in which remote assistance would be useful. For illustrative purposes, examples below describe requests for remote assistance from a remote human guide, but it should be generally understood that the request could also be sent to a passenger of the vehicle or to a remote computing system as well or instead.

A predetermined set of situations may be defined for which remote input may be requested by the vehicle. Within examples, the set of predetermined situations may include scenarios for which the autonomous vehicle can autonomously identify that it is in the scenario, ask a useful question to a human operator, and interpret a response from the human operator in order to proceed with autonomous operation. In some examples, the set may vary depending on the type or version of the vehicle, the geographical location of the vehicle, the current time or weather conditions, etc. A control system on a vehicle may identify that the vehicle is in one of the predetermined situations based on sensor data collected about the environment as described above.

FIGS. 4A-4F collectively describe one scenario that may be included within the predetermined set of scenarios, an unprotected left turn. An unprotected left turn may be defined as a scenario where the vehicle is approaching or stopped at a solid green light (but without a green arrow) waiting to make a left turn at an intersection where there is a possibility of oncoming traffic in the opposite lane that might interfere with the turn. In such a scenario, it may be useful to have a human guide verify that no car is approaching (e.g., by verifying that the autonomous vehicle's representation of the environment is accurate) before the vehicle completes the turn. In such a scenario, it may be difficult for the vehicle to ascertain whether it can safely complete the turn with high confidence, but a human guide viewing a video feed from the autonomous vehicle may be able to easily make the determination, much like a typical human driver might.

For instance, referring to FIG. 4B, the autonomous vehicle 402 may be planning to make a left turn on the green light 404. Because the autonomous vehicle 402 does not have a green arrow, the autonomous vehicle 402 may be required to yield to oncoming traffic. In this example, the autonomous vehicle 402 may determine based on sensor data that a car 406 coming in the opposite direction is pulled over to the side of the road and will not interfere with a left turn. However, because the car 406 has the right-of-way, the autonomous vehicle 402 may request assistance in order to verify that it can safely complete the left turn.

In another example embodiment, the set of predetermined situations may also include a scenario in which an autonomous vehicle is attempting to make a right turn at an intersection with a red light. A human guide may be used to verify a right turn would not interfere with cross traffic and/or that no pedestrians may be crossing or about to cross the intersection, for example. Other scenarios involving autonomous decisions that must be made by an autonomous vehicle at an intersection may be included within the set of predetermined situations in some examples as well, including other types of intersections (e.g., railroad crossings). In other examples, scenarios involving a malfunctioning traffic light or a failure to detect a traffic light at an intersection may be included.

In further examples, a request for assistance may be sent to a human guide in scenarios where it may be necessary for the autonomous vehicle to check the occupancy of the vehicle. For instance, the vehicle may need to verify that the vehicle is empty after dropping off passengers or that the correct number of people have gotten into the vehicle after passengers have been picked up. Another example scenario may involve checking that passengers have all fastened their seat belts or that all car doors have been closed shortly after boarding the vehicle. A further example scenario may involve checking that passengers have taken all of their belongings with them after being dropped off. Other scenarios in the context of dropping off or picking up passengers may be included with the set of predetermined situations in some examples as well or instead.

In additional examples, the set of predetermined situations may include scenarios where a vehicle (e.g., a stopped or parked car) or other obstacle (e.g., a bicycle) is blocking a lane within a road. For example, an autonomous vehicle may request assistance to determine whether to wait for the blockage to clear, pass on the left, pass on the right, turn around, and so on. In further examples, situations where a vehicle (e.g., a parked moving van or double-parked car) must be passed by moving into a lane of oncoming traffic may be included. In other examples, the set of predetermined situations may include blockages within a parking lot, such as partial blockages (e.g., by a stopped delivery truck), a car slowly backing out, or shopping carts or other moving or stationary obstacles in the path or vicinity of an autonomous vehicle.

In further examples, the set of predetermined scenarios may include situations where the vehicle encounters a temporary stop sign (e.g., a stop sign that is not present on a permanent map used by the vehicle for navigation). In such a scenario, a human assistor may be used to determine whether the identified sign is in fact a temporary stop (e.g., a posted sign in a construction zone or a sign being held up by a road worker or other human), a permanent stop sign that should be added to the map, or something else (e.g., a different kind of sign or some other object misidentified as a stop sign). In some examples, the human assistor may also give instructions to the vehicle how to proceed based on identification of the sign as well. For instance, the human assistor may confirm that the sign is a stop sign (either temporary or permanent) and instruct the vehicle to come to a stop. In other examples, situations where a temporary traffic light or different type of temporary traffic signal or sign is encountered may also be included. Other example scenarios may include encountering a construction site or construction zone, encountering an accident site, detecting flares or cones, or detecting a person (e.g., a worker, policeman, or bystander) directing traffic.

In yet further examples, scenarios where a particular type of vehicle is detected may be included with the set of scenarios, such as a police car, an ambulance, a fire truck, a school bus, a municipal bus, a garbage truck, a mail vehicle, or a different type of special vehicle. In other examples, certain types of identifiable environments may be included as well, such as travelling through a neighborhood, entering a freeway, or navigating a boulevard. In additional examples, certain types of audio signals, such as sirens or honking horns may be scenarios included within the set. In another example, any scenario with ill-defined precedence for the vehicle to follow may be included as well.

It should be understood that the above examples are not meant to be limiting nor are they meant to be required. An example vehicle may request assistance for a set of scenarios that includes any combination of the above scenarios and/or other examples not specifically listed as well.

Block 306 of method 300 includes sending a request for assistance to a remote assistor. The request may include the vehicle's current representation of its environment (e.g., such as depicted in FIG. 4B) as well as the identified situation from the set of predetermined situations, as discussed above with respect to block 304. In some examples, the request may additionally include at least a subset of the sensor data collected by the vehicle from its surrounding environment. For example, a live video stream from one or more video cameras and/or still photos may be transmitted along with the request for assistance.

Figure 4C:
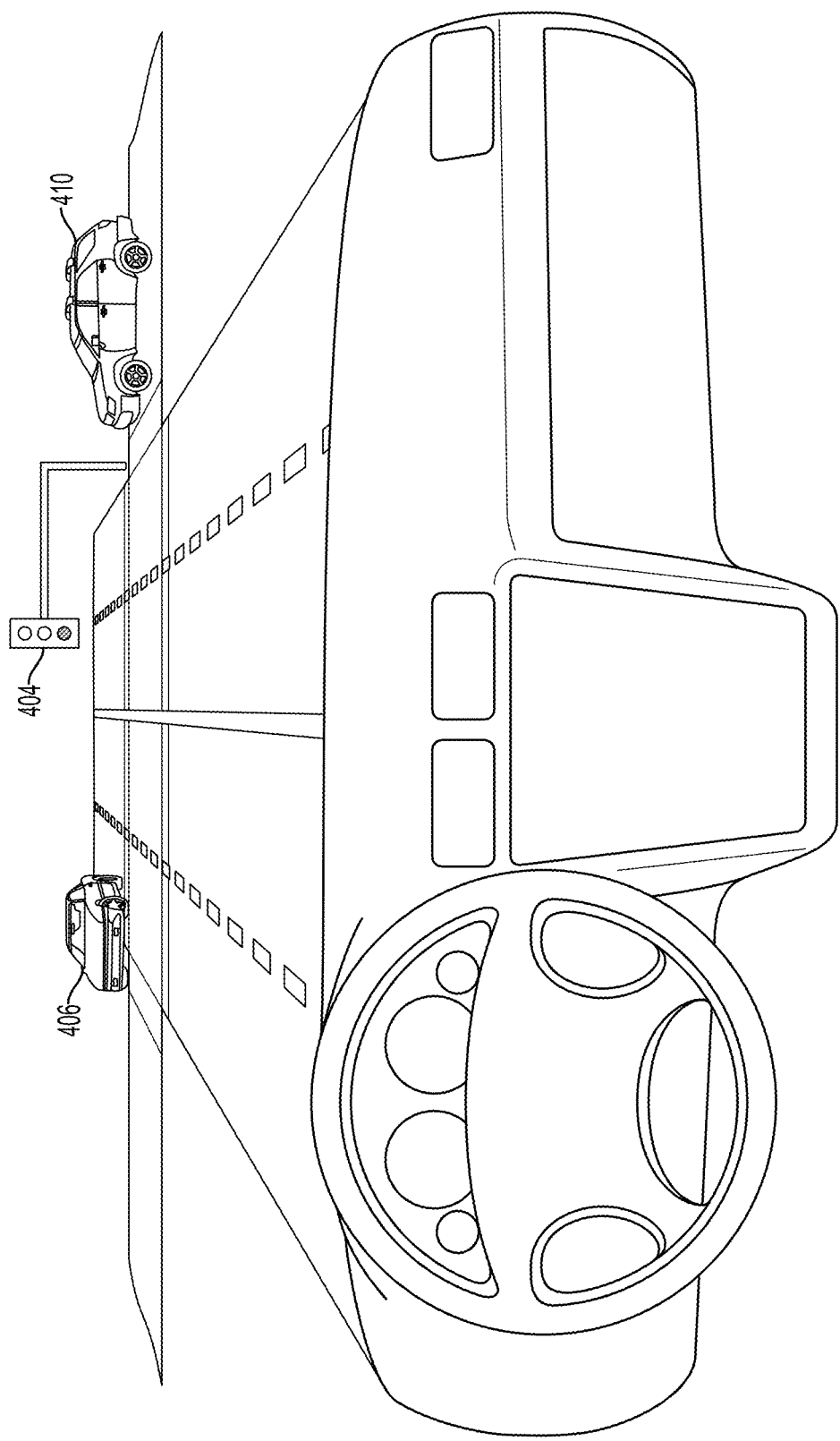
FIG. 4C illustrates a video feed taken from the vehicle in FIG. 4A, according to an example embodiment.

FIG. 4C shows a video stream of the environment 400 of autonomous vehicle 402 from the point-of-view of the autonomous vehicle 402. For example, the autonomous vehicle 402 may be equipped with one or more video cameras which capture video streams of a portion of the environment 400. This data may be transmitted along with the request with assistance for use by the remote operator. In this example, the portion of the environment 400 captured in the video stream includes cars 406 and 410 as well as traffic light 404. In some examples, the cameras may be moveable (and possibly may be controlled directly or indirectly by a remote operator) in order to capture video of additional portions of the environment 400 in order to resolve certain scenarios.

In further examples, the request for assistance may additionally include one or more suggested autonomous operations for the vehicle to take in the identified situation. For example, referring back to the scenario described with respect to FIG. 4, the vehicle may transmit options that may include holding position or completing the left turn. In one example, the vehicle may send a single suggested operation in order to receive verification of its proposed course of action, and may hold position until a response is received. In other examples, the vehicle may send a set of two or more proposed options for the remote assistor to select from. In some examples, the human guide may be able to provide a different operation for the vehicle to take as well or instead.

Figure 4D:
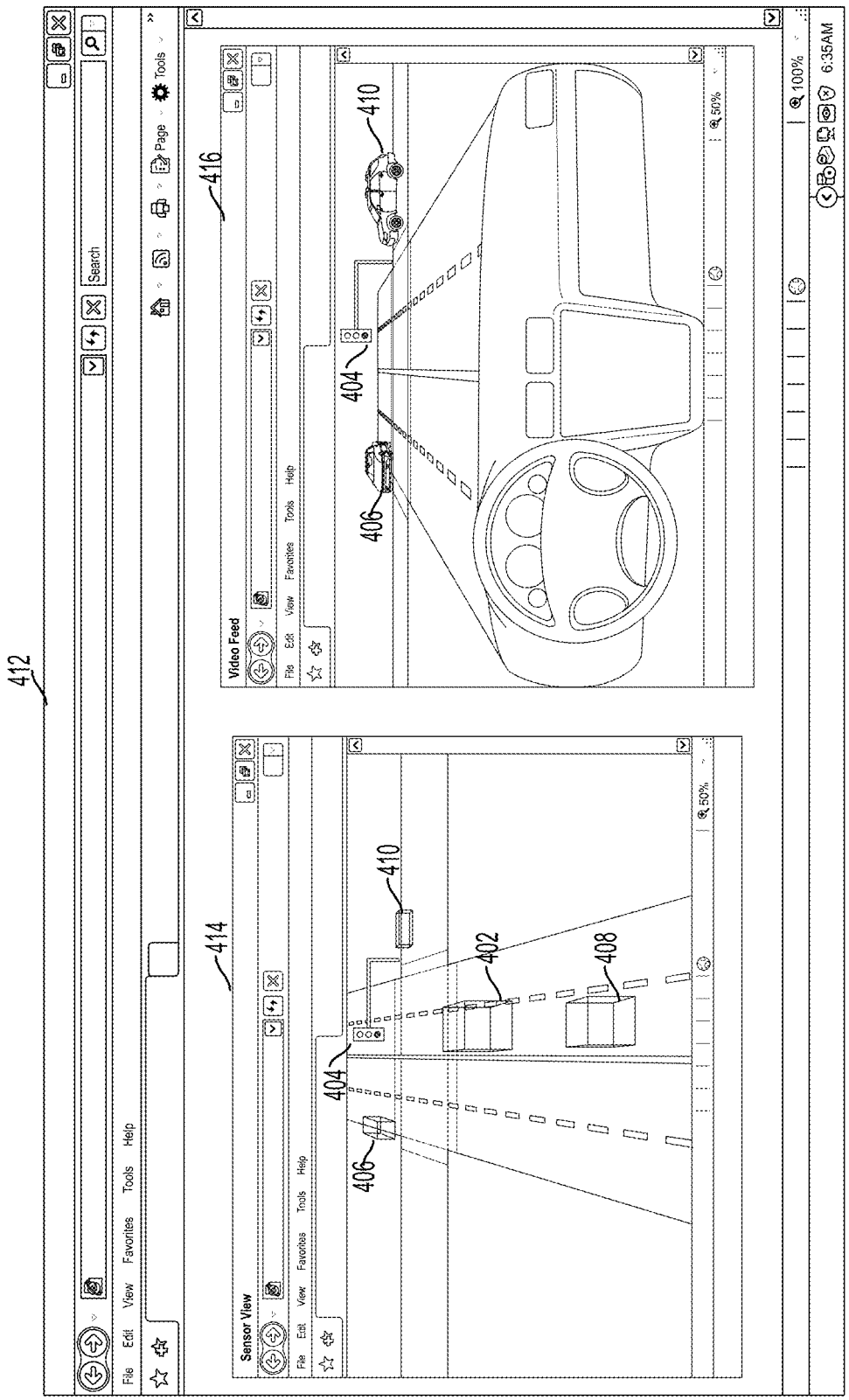
FIG. 4D illustrates a user interface containing the sensor representation from FIG. 4B and the video feed from FIG. 4C, according to an example embodiment.

In some examples, the human operator may be located in a remote location that has a wireless connection with a communication system of the vehicle. For example, a remote human operator may be located at a remote computer terminal with a user interface that provides information from the autonomous vehicle in order for the human operator to answer the request. For instance, FIG. 4D shows one example user interface that may be presented to a human operator. The user interface 412 may include separate sub-windows 414 and 416. The first sub-window 414 may include the vehicle's representation of its environment, such as described above with respect to FIG. 4B. The second sub-window 416 may include a video stream of a portion of the environment, such as described above with respect to FIG. 4C. Accordingly, the human operator may be able to compare the vehicle's understanding of its environment with the video stream to verify the vehicle's representation of its environment and/or to verify a planned course of action of the vehicle. In some examples, the vehicle's representation of its environment may also be overlayed on top of the video stream within the user interface. For instance, rather than showing the vehicle's representation in sub-window 414 and the video stream in sub-window 416 as separate windows within a user interface as shown in FIG. 4C, a user interface may contain a single viewing window with both the video stream and the vehicle's representation aligned. Overlaying the vehicle's representation may make it easier for an operator to understand how detected objects in the vehicle's representation may correspond to visual objects within the video stream.

In other example embodiments, the request for assistance may be sent to a human assistor located within the autonomous vehicle, such as a passenger in the passenger seat or a person sitting in the driver's seat. Some operations which require a certain amount of human intuition may be difficult to automate with an autonomous vehicle. For instance, determining an exact drop-off location (e.g., where the passenger has room to comfortably exit the vehicle) may be more easily completed with the assistance of the passenger. Other types of scenarios may also benefit from assistance from a passenger of the vehicle. In some examples, a different set of scenarios may lead to a request being sent to a remote guide than the set of scenarios for which a request is sent to a passenger of the vehicle.

In additional embodiments, the request may be sent to a more powerful computer than exists within the autonomous vehicle, such as a remote computer server. The more powerful computer may have more computational power than the computing system in the autonomous vehicle and/or more stored data about the environment, and therefore may able to more accurately determine how to proceed within a given scenario. In some embodiments, the autonomous vehicle may wirelessly communicate a subset of the sensor data collected about the environment to the remote computing device as well.

In further embodiments, the more powerful computer may also not be able to determine a proper course of action to the identified scenario. When this happens, the system may fall back to a human operator to try to resolve the scenario in some example systems. Additionally, in some embodiments, the more powerful computer and the human operator may both receive a request for assistance. Therefore, either the more powerful computer or the human operator (and possibly both) may be able to determine a proper course of action for the vehicle. By transmitting data to both the more powerful computer and the human operator at approximately the same time, there may be some redundancy benefit in case one or the other fails to respond fast enough. The request for assistance may additionally contain a timeout amount indicating an amount of time in which a response to the request is needed.

Block 308 of method 300 includes receiving a response from the remote assistor indicating an autonomous operation. The response may indicate to the autonomous vehicle how to proceed within the identified scenario. In some examples, the vehicle may have sent a single proposed operation to the remote assistor. In that case, the response may indicate that the vehicle is free to proceed with the proposed operation, and the vehicle may hold position until receiving the response. In other examples, the vehicle may have sent two or more proposed operations to the remote assistor, in which case the response may indicate which of the proposed operations the vehicle should take. The remote assistor may be able to propose different alternative operations for the vehicle to take as well or instead.

Figure 4E:
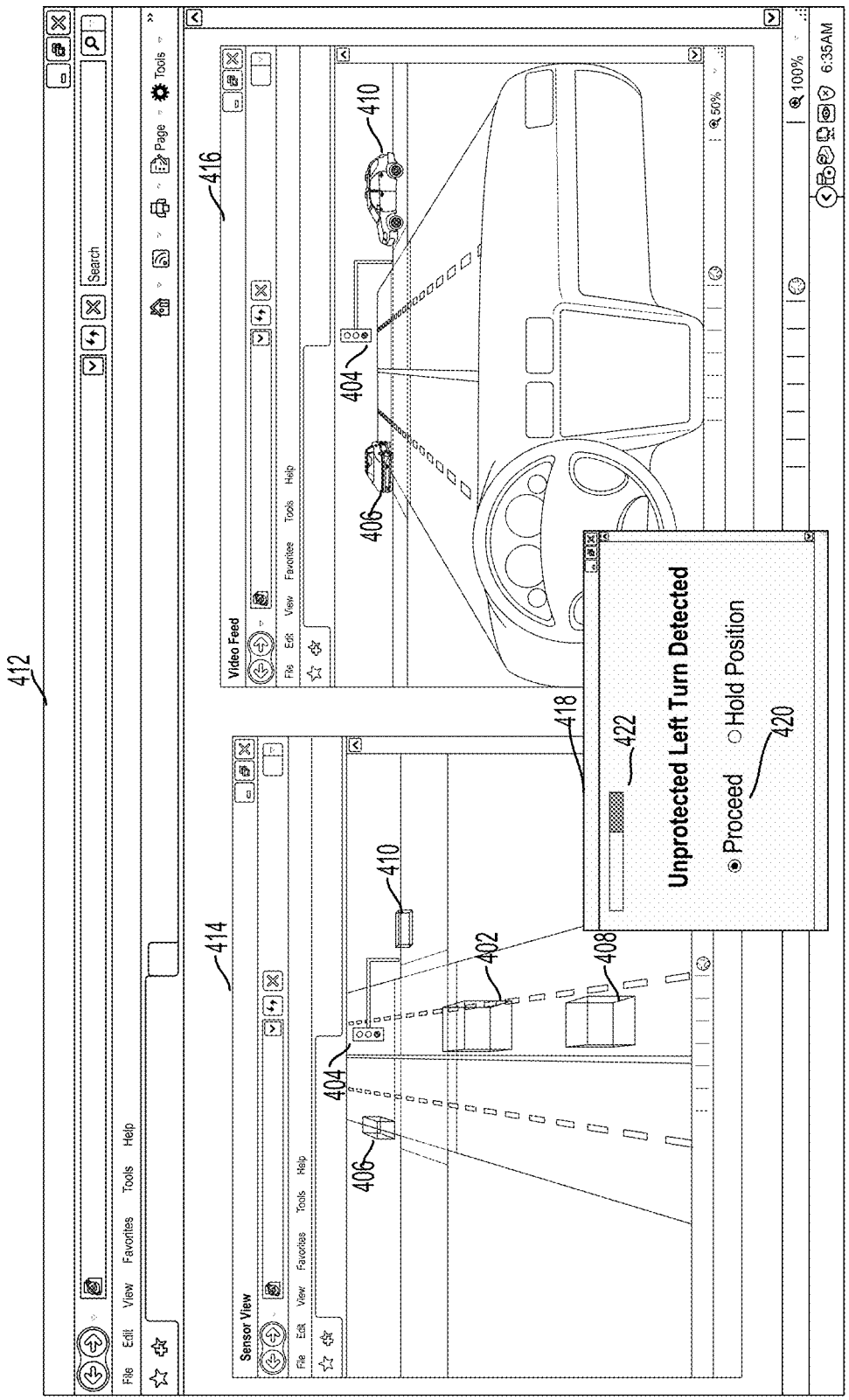
FIG. 4E illustrates the user interface from FIG. 4D including a control menu, according to an example embodiment.

The remote assistor may be presented with a user interface that contains a control menu that enables a remote assistor to send a response to an autonomous vehicle indicating how the vehicle should proceed in a given scenario. For example, FIG. 4E shows an example user interface that contains a first sub-window showing the vehicle's representation of its environment and a second sub-window showing a video of a portion of the vehicle's environment, such as described above with respect to FIG. 4D. FIG. 4E additionally contains a control menu 418 that allows a human operator to select an autonomous operation for the vehicle. In this example, the human guide has selected Proceed 420 in order to indicate that the autonomous vehicle should proceed with the left turn. The control menu 418 may additionally contain a latency bar 422 indicating how old the received sensor data is, which may affect the human guide's response.

The response to the request for assistance may be received in a number of different ways. In cases where the request for assistance was sent to a remote assistor (or a remote computing system) not located within the vehicle, the response may be received wirelessly through a communication system located within the autonomous vehicle. In other embodiments, such as those where the request for assistance was sent to a passenger located with the vehicle, the response may be received when the passenger enters an autonomous operation into a user interface of a computer system located within the vehicle. A passenger may be able to instruct the vehicle in other ways as well, such as through voice commands or through a handheld mobile device. Other modes of transmitting and/or receiving the request for assistance and/or the response to the request may also be used.

Block 310 of method 300 includes performing the autonomous operation. When the vehicle receives the response to the request for assistance, the response may indicate that the vehicle is free to proceed with a proposed operation or suggest a different operation for the vehicle to use. Based on the response, the vehicle may proceed with the autonomous operation, which may be to turn, start, stop, pass on the left or right, change speed and/or direction, pull over, back up, or any number of other possible operations. In some examples, the vehicle may do additional processing before proceeding with the autonomous operation. For example, if the latency associated with the received instruction is too high to be trusted, the vehicle may send another request for assistance before proceeding. In another example, the vehicle may override an operator's response based on recently detected sensor data (e.g., a car making an unprotected left turn may suddenly detect oncoming traffic and override a remote operator's instruction to proceed).

Figure 4F:
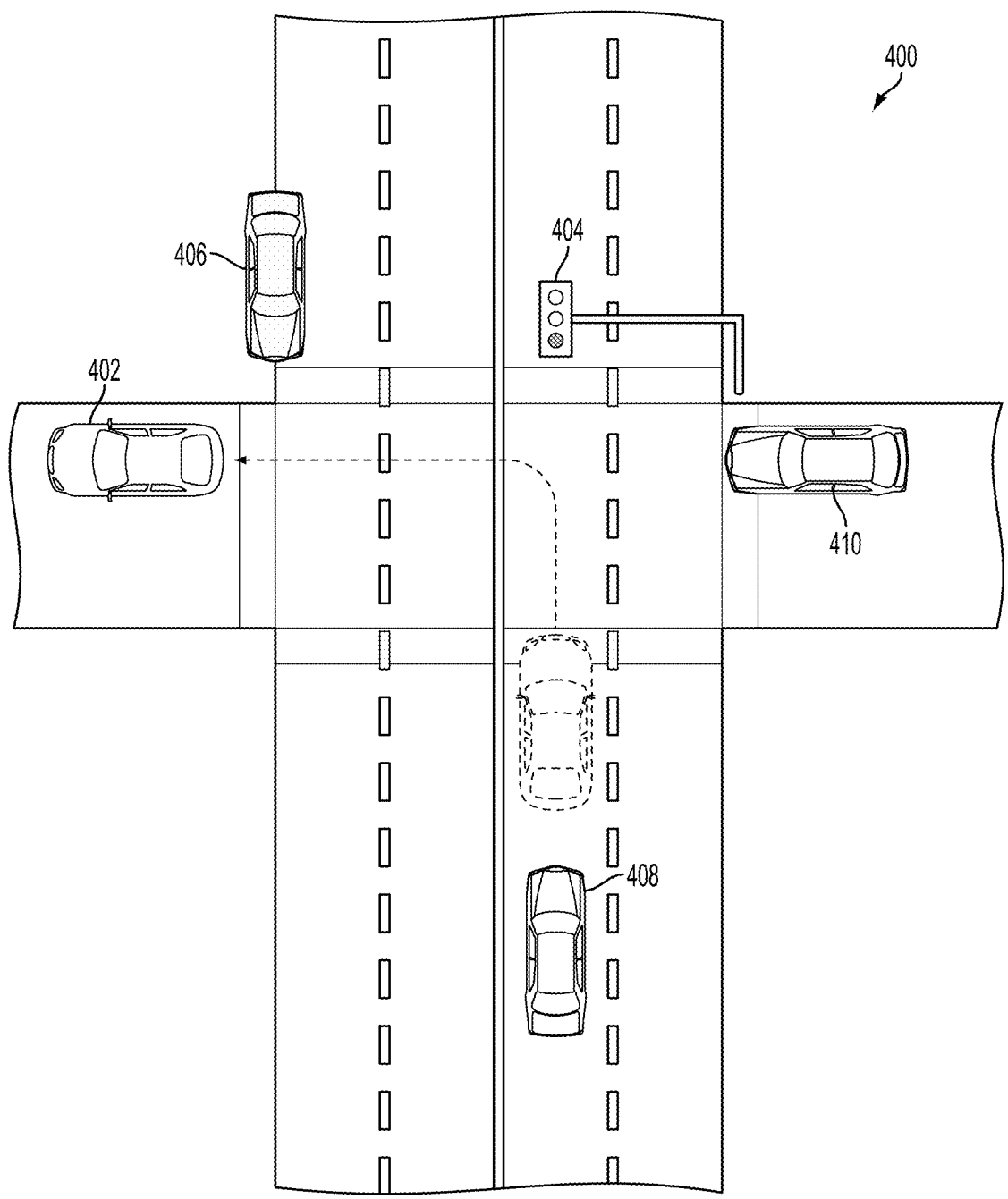
FIG. 4F illustrates a top view of the autonomous vehicle from FIG. 4A after completing an operation, according to an example embodiment.

FIG. 4F shows the autonomous vehicle 402 completing the left turn. For example, a remote operator may have viewed a video stream of the environment and verified that the vehicle 406 in the opposite lane is pulled over and stopped such that the vehicle is unlikely to interfere with a left turn by the autonomous vehicle 402. Accordingly, the vehicle may have received a response from the remote operator indicating that the vehicle may safely proceed with the left turn as shown in the figure.

Figure 5:
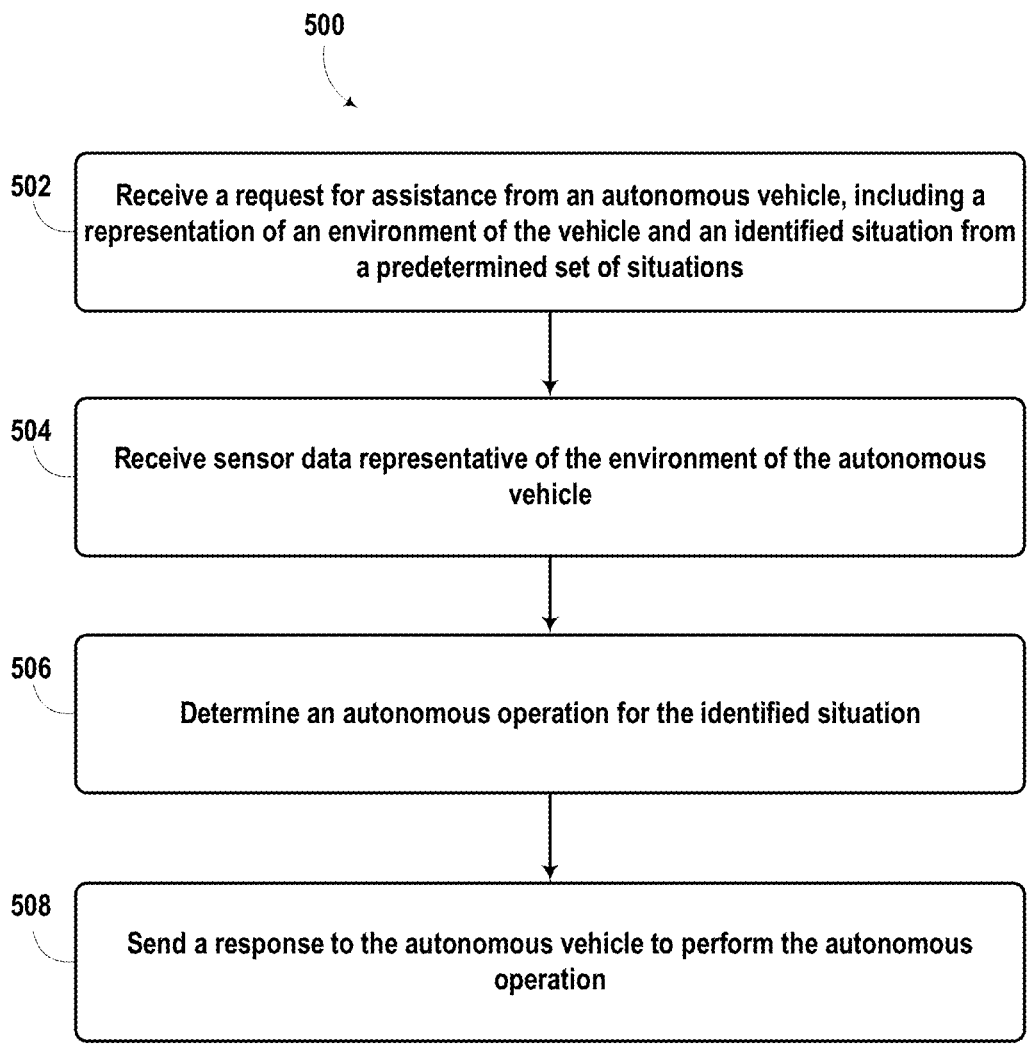
FIG. 5 illustrates a block diagram of another method, according to an example embodiment.

FIG. 5 is a block diagram of another method, according to an example embodiment. Method 500 as shown in FIG. 5 may be executed to respond to a request for assistance from an autonomous vehicle, such as a request sent by a vehicle as described above with respect to method 300. Method 500 may be executed by a remote computing system, such as a computing system with a user interface that receives input from a remote human operator. Method 500 may also be executed by a more powerful computing system than exists on an autonomous vehicle, such as a computing system configured to answer requests from autonomous vehicles. Method 500 may be executed by a computing system of an autonomous vehicle as well, such as when the autonomous vehicle requests assistance from a passenger of the vehicle.

In addition, each block of the flowchart shown in FIG. 5 may represent circuitry that is wired to perform the specific logical functions in the process. Unless specifically indicated, functions in the flowchart shown in FIG. 5 may be executed out of order from that shown or discussed, including substantially concurrent execution of separately described functions, or even in reverse order in some examples, depending on the functionality involved, so long as the overall functionality of the described method is maintained.

Block 502 of method 500 includes receiving a request for assistance from an autonomous vehicle, including a representation of an environment of the vehicle and an identified situation from a predetermined set of situations. The request may include any of the aspects of a request described above with respect to method 300. In particular, the request may include a representation of the environment built from sensor data collected by the vehicle, such as shown in FIG. 4B. Additionally, the request may indicate an identified situation from a predetermined set of situations for which the vehicle may request remote assistance. The set may include any of the scenarios described above with respect to method 300.

Block 504 of method 500 includes receiving sensor data representative of the environment of the autonomous vehicle. The sensor data may include any of the types of sensor data described above with respect to method 300. In particular, the sensor data may include one or more video streams of portions of the environment of the vehicle, such as shown in FIG. 4C. Other types of sensor data may also be received, including still images, radar or laser range finder data indicating distance to and/or location of nearby objects, or audio data captured by one or more microphones.

Block 506 of method 500 includes determining an autonomous operation for the identified situation. In some examples, the vehicle may have sent a request for assistance along with a proposed operation. In those examples, determining the autonomous operation may involve determining whether (or when) the vehicle should perform the proposed operation. In other examples, the vehicle may have sent two or more different possible proposed operations along with its request for assistance. In those examples, determining the autonomous operation may involve selecting from the possible proposed options. In further examples, the autonomous operation may be separately determined instead of or in addition to receiving proposed operations from the vehicle.

In some example, method 500 may involve the use of a remote human assistor, such as a human guide who accesses a user interface, such as the one depicted in FIGS. 4D and 4E. The human guide may be presented with the vehicle's own representation of its environment and/or additional sensor data such as a live video feed. The human guide may also be presented with the identified scenario that prompted the requested for assistance. In some examples, the human guide may verify that the vehicle's representation of its environment and/or a proposed operation of the vehicle is correct by looking at the video feed. Then, the human guide may input an autonomous operation into the user interface (e.g., by selecting from a list of possible options or manually inputting a different operation). In some examples, a human guide may be presented with a list of preset options that they can always send to the vehicle (e.g., "Stop immediately," "Pull over soon," etc.). In other examples, each scenario within the predetermined set of scenarios for which an autonomous vehicle requests assistance may have its own preset options for the human guide to choose from.

In further examples, method 500 may involve receiving help from a passenger of the autonomous vehicle in order to determine an autonomous operation for the vehicle. The passenger may be asked for assistance through a user interface in the car, through a remote device (e.g., cellphone), or through a verbal request, for example. The passenger may then respond by selecting an autonomous operation for the vehicle (e.g., by selecting an option on a user interface or by giving a vocal command to the vehicle).

In additional examples, method 500 may involve receiving help from a more powerful remote computing system in order to determine an autonomous operation for the vehicle. For instance, the remote computing system may be sent information about the vehicle including the current scenario the vehicle has identified as well as sensor data. The remote computing system may then use the sensor data to verify the vehicle's situation and determine a proposed operation for the vehicle, much like a human guide. In some examples, requests for assistance may be sent to multiple sources (e.g., a human guide and a remote computing system) for independent verification or redundancy benefits as well. In those examples, determining the autonomous operation may involve combining received input from multiple sources.

Block 508 of method 500 involves sending a response to the autonomous vehicle to perform the autonomous operation. The autonomous operation may be any of the autonomous operations described above, such as to turn, start, stop, pass on the left or right, change speed and/or direction, pull over, back up, or any number of other possible operations. In cases where method 500 is carried out by a remote computing system, the response may be sent wirelessly to a communication system of the autonomously vehicle. In other examples (such as when the autonomous operation is determined by interfacing with a passenger of the vehicle), the response may be sent through a direct hardware connection within the autonomous vehicle. The response may be transmitted to a control system of the autonomous vehicle indirectly through other systems and/or in other ways in some examples as well.

Figure 6:
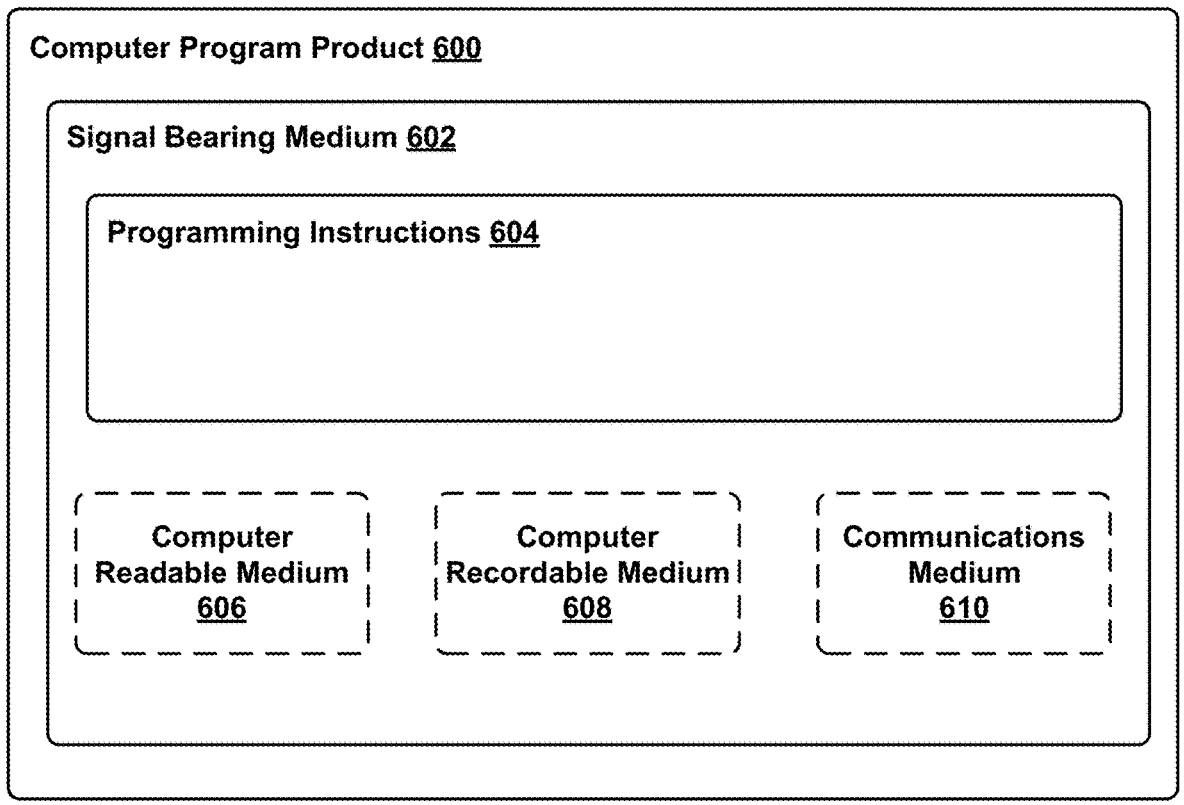
FIG. 6 is a schematic diagram of a computer program, according to an example embodiment.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may encompass a non-transitory computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprises:
receiving, at a computing system, sensor data representing an environment of a vehicle, wherein the vehicle is navigating a path based on a map of the environment;
detecting, based on the sensor data, an unexpected object in the environment;
based on detecting the unexpected object, providing one or more images of the environment to a remote computing system;
receiving, at the computing system, instructions from the remote computing system; and
controlling the vehicle based on the instructions.

2. The method of claim 1, further comprising:
detecting a plurality of objects in the environment based on the sensor data;
performing a comparison between the plurality of objects detected in the sensor data and objects represented by the map; and
detecting the unexpected object based on the comparison.

3. The method of claim 1, wherein receiving instructions comprises:
receiving a proposed operation from the remote computing system.

4. The method of claim 3, wherein the proposed operation involves instructions for the vehicle to pull over.

5. The method of claim 1, further comprising:
based on detecting the unexpected object, identifying the unexpected object; and
providing an identification for the unexpected object to the remote computing system.

6. The method of claim 5, wherein receiving instructions comprises:
receiving verification of the identification for the unexpected object.

7. The method of claim 1, wherein providing one or more images of the environment to the remote computing system comprises:
providing a live video feed to the remote computing system.

8. The method of claim 1, wherein providing one or more images of the environment to the remote computing system comprises:
providing one or more proposed operations along with a request for assistance to the remote computing system.

9. The method of claim 8, wherein receiving instructions from the remote computing system comprises:

receiving instructions to perform a given proposed operation of the one or more proposed operations.

10. The method of claim 1, further comprising:
based on detecting the unexpected object, controlling the vehicle to hold a current position.

11. An autonomous vehicle comprising:
a sensor;
a computing device configured to:
   receive sensor data representing an environment of the autonomous vehicle, wherein the autonomous vehicle is navigating a path based on a map of the environment;
   detect, based on the sensor data, an unexpected object in the environment;
   based on detecting the unexpected object, provide one or more images of the environment to a remote computing system;
   receive instructions from the remote computing system; and
   control the autonomous vehicle based on the instructions.

12. The autonomous vehicle of claim 11, wherein the computing device is further configured to:
detect a plurality of objects in the environment based on the sensor data;
perform a comparison between the plurality of objects detected in the sensor data and objects represented by the map; and
detect the unexpected object based on the comparison.

13. The autonomous vehicle of claim 11, wherein the instructions include a proposed operation provided by the remote computing system.

14. The autonomous vehicle of claim 11, wherein the computing device is further configured to:
identify the unexpected object; and
provide an identification of the unexpected object to the remote computing system.

15. The autonomous vehicle of claim 14, wherein the instructions include a verification of the identification of the unexpected object.

16. The autonomous vehicle of claim 15, wherein the unexpected object is a temporary traffic sign.

17. The autonomous vehicle of claim 11, wherein the computing device is further configured to:
provide one or more proposed operations along with a request for assistance to the remote computing system.

18. The autonomous vehicle of claim 17, wherein the instructions indicate for the autonomous vehicle to perform a given proposed operation of the one or more proposed operations.

19. The autonomous vehicle of claim 11, wherein the computing device is configured to hold a current position of the autonomous vehicle until receiving a release instruction from the remote computing system.

20. A non-transitory computer readable medium having stored therein instructions, that when executed by a computing system, cause the computing system to perform functions comprising:
receiving sensor data representing an environment of a vehicle, wherein the vehicle is navigating a path based on a map of the environment;
detecting, based on the sensor data, an unexpected object in the environment;
based on detecting the unexpected object, providing one or more images of the environment to a remote computing system;
receiving instructions from the remote computing system; and
controlling the vehicle based on the instructions.

* * * * *